United States Patent
Takebayashi

(10) Patent No.: US 10,615,469 B2
(45) Date of Patent: Apr. 7, 2020

(54) CAPACITY RECOVERY METHOD AND CAPACITY RECOVERY SYSTEM FOR SECONDARY BATTERY

(71) Applicant: TOYOTA JIDOSHA KABUSHIKI KAISHA, Toyota-shi, Aichi-ken (JP)

(72) Inventor: Yoshitomo Takebayashi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 119 days.

(21) Appl. No.: 15/819,886

(22) Filed: Nov. 21, 2017

(65) Prior Publication Data
US 2018/0151926 A1    May 31, 2018

(30) Foreign Application Priority Data
Nov. 30, 2016  (JP) ................................ 2016-233576

(51) Int. Cl.
| | |
|---|---|
| *H01M 10/617* | (2014.01) |
| *H01M 10/44* | (2006.01) |
| *H01M 10/615* | (2014.01) |
| *H01M 10/42* | (2006.01) |
| *H01M 10/48* | (2006.01) |

(52) U.S. Cl.
CPC ....... *H01M 10/617* (2015.04); *H01M 10/425* (2013.01); *H01M 10/4242* (2013.01); *H01M 10/44* (2013.01); *H01M 10/486* (2013.01); *H01M 10/615* (2015.04); *H01M 2010/4271* (2013.01)

(58) Field of Classification Search
None
See application file for complete search history.

(56) References Cited

U.S. PATENT DOCUMENTS

2015/0295448 A1    10/2015  Sugeno et al.

FOREIGN PATENT DOCUMENTS

| JP | 2011-175935 A | | 9/2011 |
|---|---|---|---|
| JP | 2012-028024 A | | 2/2012 |
| JP | 2012028024 A | * | 2/2012 |
| JP | 2014-110131 A | | 6/2014 |
| JP | 2016-126881 A | | 7/2016 |
| JP | 2016126881 A | * | 7/2016 |

* cited by examiner

*Primary Examiner* — Daniel S Gatewood
(74) *Attorney, Agent, or Firm* — Sughrue Mion, PLLC

(57) ABSTRACT

In a capacity recovery method for a secondary battery including a negative electrode active material layer having a facing portion that faces a positive electrode active material layer and a non-facing portion that does not face the positive electrode active material layer, the secondary battery is retained in a state where temperature of the non-facing portion is higher than temperature of the facing portion for a prescribed time.

7 Claims, 6 Drawing Sheets

CAPACITY RECOVERY METHOD AND CAPACITY RECOVERY SYSTEM FOR SECONDARY BATTERY

INCORPORATION BY REFERENCE

The disclosure of Japanese Patent Application No. 2016-233576 filed on Nov. 30, 2016 including the specification, drawings and abstract is incorporated herein by reference in its entirety.

BACKGROUND

1. Technical Field

The present disclosure relates to a capacity recovery method and a capacity recovery system for a secondary battery.

2. Description of Related Art

Secondary batteries, such as a lithium-ion secondary battery, typically include a positive electrode having a positive electrode active material layer, a negative electrode having a negative electrode active material layer, and an electrolyte. The negative electrode active material layer may have an area formed wider than that of the positive electrode active material layer in a viewpoint of suppressing deposition of charge carriers in the negative electrode, and the like. In such a case, the negative electrode active material layer has a facing portion that faces the positive electrode active material layer, and a non-facing portion that does not face the positive electrode active material layer. In such a secondary battery, charging and discharging diffuses the charge carriers also in the non-facing portion of the negative electrode active material layer. However, the non-facing portion is distanced from the positive electrode active material layer. Accordingly, the charge carriers diffused in the non-facing portion are hard to be released even during discharging, and tend to stay in the non-facing portion. Therefore, in the secondary battery including the negative electrode active material layer having the opposite portion and the non-facing portion, some of the charge carriers are accumulated in the non-facing portion through repetition of charging and discharging. As a result, the capacity of the battery is lowered in proportion to the charge carriers accumulated in the non-facing portion.

Accordingly, in order to recover the capacity of the battery lowered by repetition of charging and discharging, various capacity recovery methods and battery control methods have been proposed (see Japanese Unexamined Patent Application Publication Nos. 2012-028024 (JP 2012-028024 A), 2011-175935 (JP 2011-175935 A), and 2014-110131 (JP 2014-110131 A)). For example, in the capacity recovery method disclosed in JP 2012-028024 A, the secondary battery is left under a temperature environment of 45 to 65° C. so as to move the charge carriers accumulated in the non-facing portion to the facing portion.

SUMMARY

However, as a result of examining the above methods, the inventor of the present disclosure found room for improvement of the techniques disclosed. That is, in the capacity recovery method in JP 2012-028024 A, when the secondary battery is left under the temperature environment of 45 to 65° C., side reactions occur in the facing portion, the side reactions including decomposition of a coating film formed on a surface of the negative electrode active material. Accordingly, when processing of the capacity recovery is performed a plurality of times over a long period of time, effects such as increase in resistance are generated, resulting in deterioration in battery characteristics.

The present disclosure provides a capacity recovery method and a capacity recovery system that allow efficient recovery of the capacity of a battery while suppressing deterioration in the battery.

The present disclosure provides a capacity recovery method for a secondary battery, the secondary battery including a positive electrode having a positive electrode active material layer, a negative electrode having a negative electrode active material layer, and an electrolyte, the negative electrode active material layer having a facing portion that faces the positive electrode active material layer and a non-facing portion that does not face the positive electrode active material layer. In the capacity recovery method for a secondary battery, the secondary battery is retained in the state where temperature of the non-facing portion is higher than temperature of the facing portion for a prescribed time.

According to the capacity recovery method, moving velocity of the charge carriers accumulated in the non-facing portion is enhanced, which allows quick movement of the charge carriers to the facing portion. As a consequence, efficient recovery of the battery capacity can be achieved. According to the capacity recovery method, in the facing portion where the positive electrode active material layer and the negative electrode active material layer face each other, occurrence of side reactions can be suppressed. Therefore, deterioration in the battery can be suppressed even when capacity recovery processing is repeated.

In one aspect of the capacity recovery method disclosed herein, when the temperature of the non-facing portion is equal to or below the temperature of the facing portion, the non-facing portion may be heated. As a consequence, more stable and efficient capacity recovery processing can be achieved. In another aspect of the capacity recovery method disclosed herein, when the temperature of the non-facing portion is equal to or below the temperature of the facing portion, the facing portion may be cooled. As a consequence, more stable and efficient capacity recovery processing can be achieved.

In one aspect of the capacity recovery method disclosed herein, before the secondary battery is retained for the prescribed time, the secondary battery may be discharged to reduce an SOC or a state of charge of the secondary battery to 0% or below. As a consequence, the charge carriers accumulated in the non-facing portion can more smoothly be moved to the facing portion.

The present disclosure also provides a capacity recovery system for a secondary battery, including: a secondary battery including a positive electrode having a positive electrode active material layer, a negative electrode having a negative electrode active material layer, and an electrolyte, the negative electrode active material layer having a facing portion that faces the positive electrode active material layer and a non-facing portion that does not face the positive electrode active material layer; a first temperature sensor that detects temperature of the facing portion; a second temperature sensor that detects temperature of the non-facing portion; a thermoregulator that regulates the temperature of at least one of the facing portion and the non-facing portion, when the temperature of the non-facing portion is equal to or below the temperature of the facing portion; and a controller that controls the secondary battery, the first temperature sensor, the second temperature sensor, and the thermoregulator. The controller is configured to retain the secondary battery in a state where the temperature of the non-facing portion is higher than the temperature of the facing portion for a prescribed time.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, one embodiment of the present disclosure will be described with reference to the drawings in a proper manner. Factors which are other than the matters specified in this specification and which are necessary for implementation of the present disclosure (for example, component members not characterizing the present disclosure, and general battery construction processes) can be understood as matters of design of those skilled in the art based on the related art in a field concerned. The present disclosure can be executed based on the contents disclosed in this specification and common general technical knowledge in the field concerned. In the following drawings, component members and component regions demonstrating similar effects may be designated by similar reference signs to omit or simplify a redundant description thereof. The dimensional relationship (length, width, thickness, etc.) in each of the drawings does not necessarily reflect actual dimensional relationship.

Figure 1:
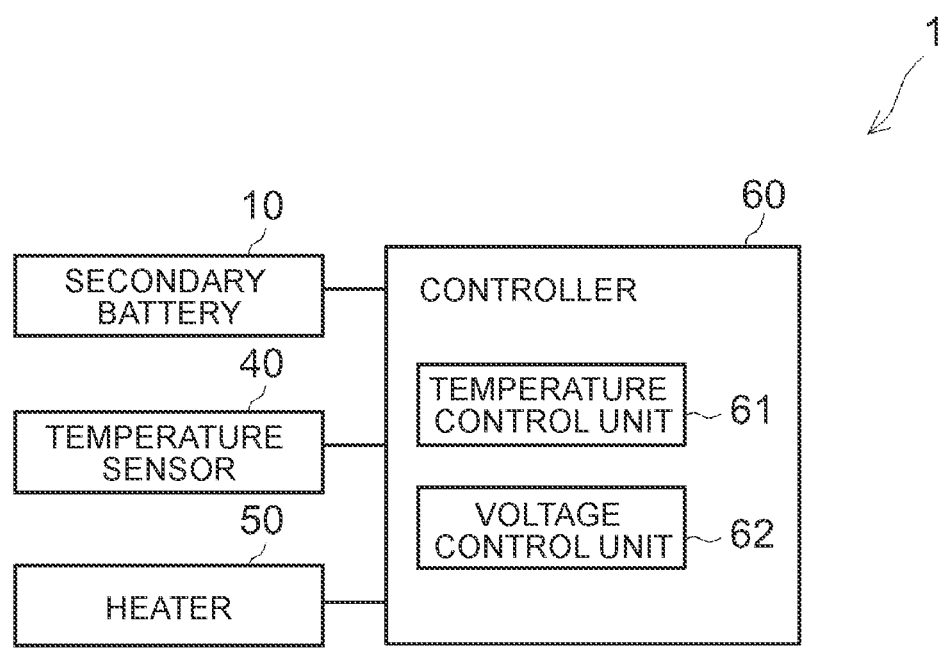
FIG. 1 is a block diagram of a capacity recovery system according to one embodiment.
Figure 2:
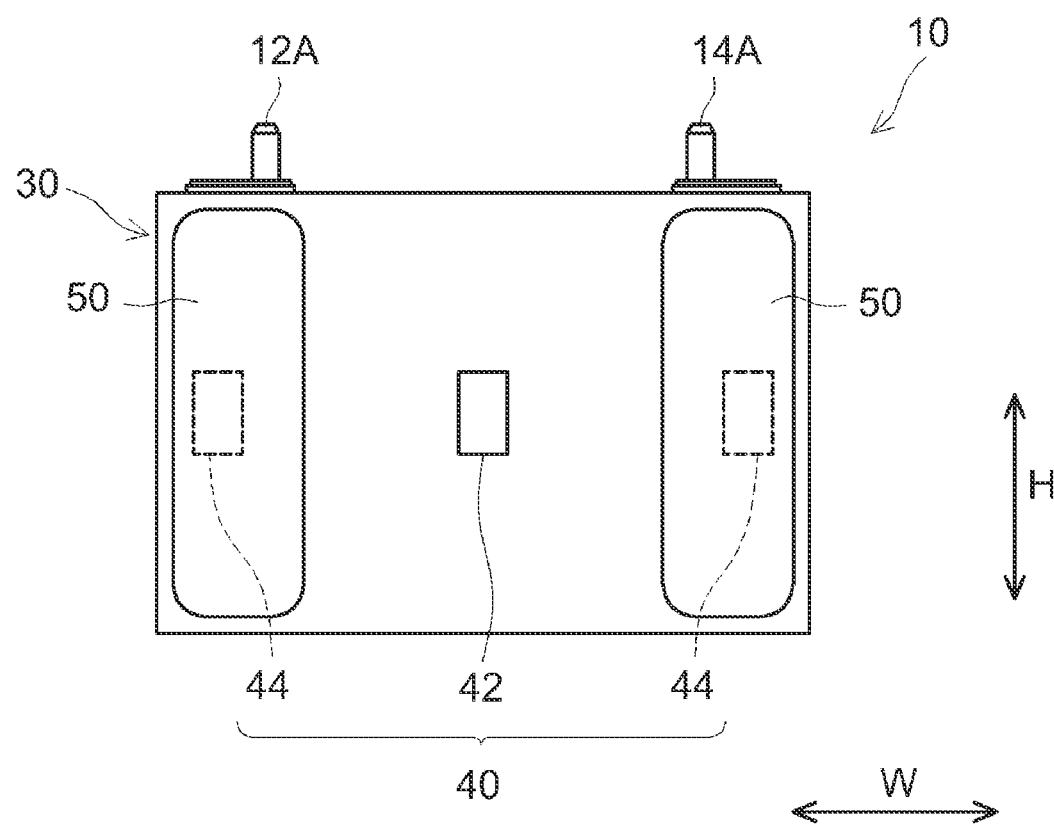
FIG. 2 is a plan view schematically illustrating an external appearance of a secondary battery according to one embodiment.

<<Capacity Recovery System>> FIG. 1 is a block diagram of a capacity recovery system 1 according to one embodiment. The capacity recovery system 1 of the present embodiment includes a secondary battery 10, a temperature sensor 40, heaters 50, and a controller 60. The secondary battery 10 is a target of capacity recovery. One or a plurality of secondary batteries 10 may be provided. The plurality of secondary batteries 10 may electrically be connected to each other through a member such as a bus bar. FIG. 2 is a plan view schematically illustrating an external appearance of the secondary battery 10 according to one embodiment. The temperature sensor 40 and the air heaters 50 are disposed outside of the secondary battery 10. The secondary battery 10, the temperature sensor 40, and the heaters 50, which are each electrically connected with the controller 60, are controlled by the controller 60. Each of the members will be described below in order.

Figure 3:
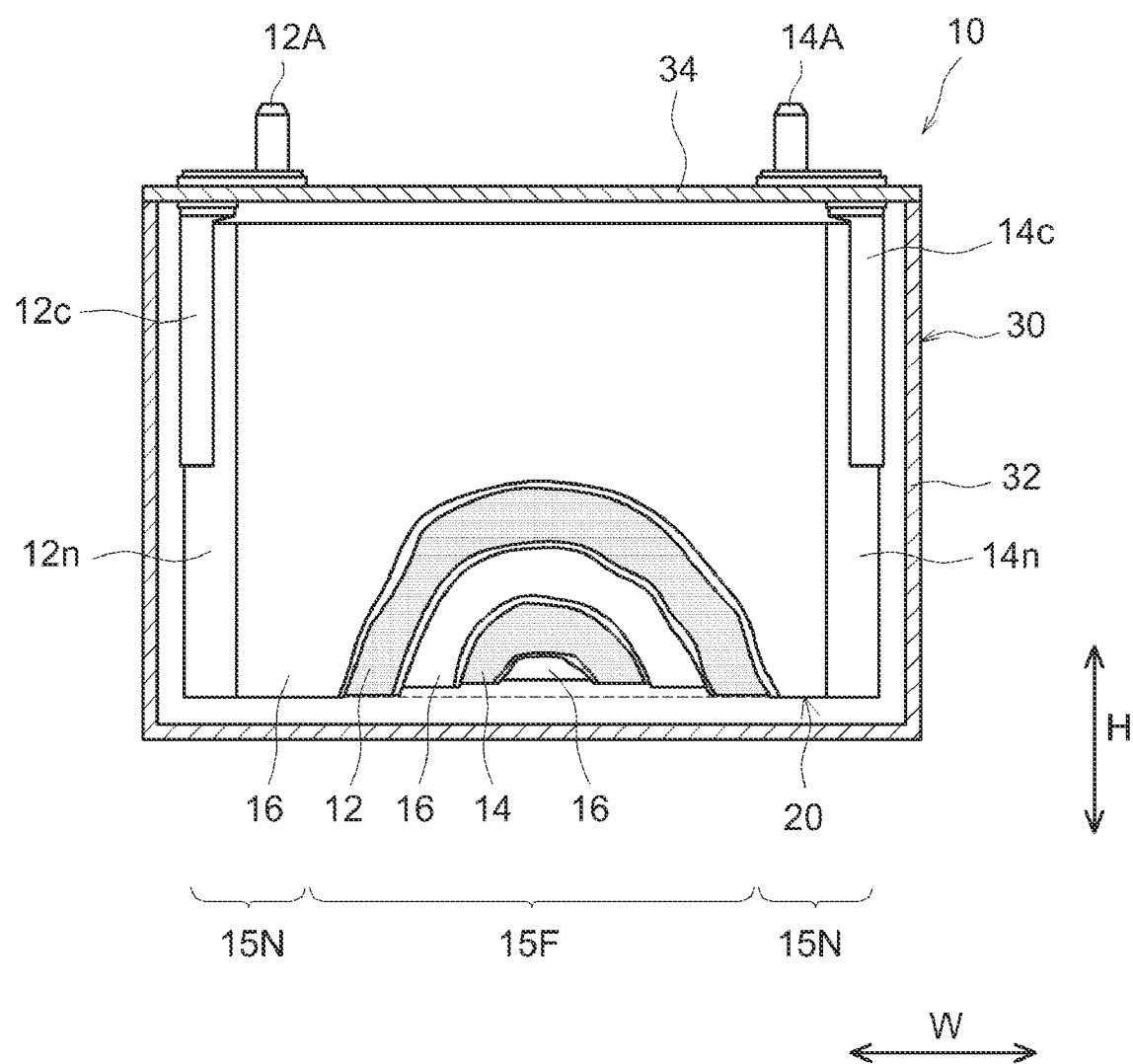
FIG. 3 is a longitudinal sectional view schematically illustrating the secondary battery according to one embodiment.

FIG. 3 is a longitudinal sectional view schematically illustrating the secondary battery 10 according to one embodiment. The secondary battery 10 is constituted of an electrode body 20 and an unillustrated electrolyte which are stored in a battery case 30. The battery case 30 includes a battery case body 32 and a lid 34 that closes an opening of the battery case body 32. From an upper portion of the lid 34, a positive electrode terminal 12A and a negative electrode terminal 14A protrude. There are no particular restrictions on the material of the battery case 30. For example, the battery case 30 may be made of lightweight metal, such as aluminum. The battery case 30 has a bottomed rectangular parallelepiped shape (square shape). However, the battery case 30 may be in other shapes, such as cylindrical shapes, and shapes of a bag made of a laminate film.

Figure 4:
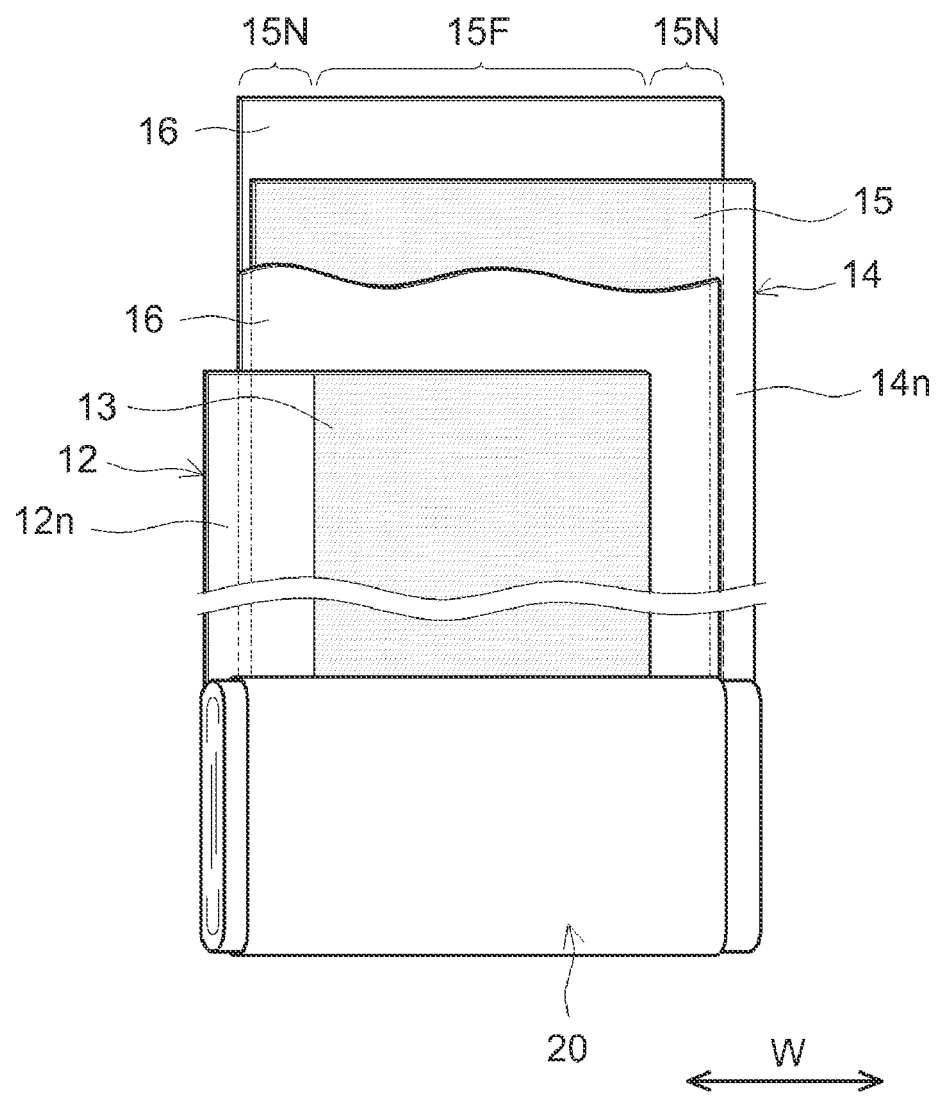
FIG. 4 is a perspective view schematically illustrating an electrode body according to one embodiment.

The configuration of the electrode body 20, which is not particularly restricted, may be identical to those of the secondary batteries in the related art. FIG. 4 is a perspective view of the electrode body 20 according to one embodiment. The electrode body 20 of the present embodiment has a belt-shaped positive electrode sheet 12, a belt-shaped negative electrode sheet 14, and a belt-shaped separator sheet 16. The electrode body 20 is a wound electrode body formed by laminating the positive electrode sheet 12 and the negative electrode sheet 14 with the separator sheet 16 interposed therebetween and winding a laminate of these sheets in a longitudinal direction. However, the electrode body 20 may be a laminated electrode body formed by laminating a rectangular positive electrode sheet and a rectangular negative electrode sheet with a rectangular separator interposed therebetween.

The positive electrode sheet 12 includes a positive electrode collector and a positive electrode active material layer 13 fixed to a surface of the positive electrode collector. Suitable as the positive electrode collector is a conductive member made of metal (for example, aluminum and nickel) having favorable conductivity. The positive electrode active material layer 13 is formed to have a specified width along a width direction W on the surface of the positive electrode collector. The positive electrode active material layer 13 contains a positive active material. Suitable examples of the positive active material include lithium-transition metal compound oxides such as $LiNi_{1/3}Co_{1/3}Mn_{1/3}O_2$, and $LiNi_{0.5}Mn_{1.5}O_4$.

The negative electrode sheet 14 includes a negative electrode collector and a negative electrode active material layer 15 fixed to a surface of the negative electrode collector. Suitable as the negative electrode collector is a conductive member made of metal (for example, copper and nickel) having favorable conductivity. The negative electrode active material layer 15 is formed to have a specified width along a width direction W on the surface of the negative electrode collector. The negative electrode active material layer 15 contains a negative active material. Suitable examples of the negative electrode active material include graphite-based carbon materials, such as natural graphite, artificial graphite, and amorphous-coated graphite (configured as graphite particles coated with amorphous carbon).

In the present embodiment, the length of the negative electrode active material layer 15 is longer than the length of the positive electrode active material layer 13 in the width direction W. Accordingly, the negative electrode active material layer 15 has a facing portion 15F that faces the positive electrode active material layer 13, and a pair of non-facing portions 15N that does not face the positive electrode active material layer 13. The facing portion 15F is positioned in a central portion of the width direction W. The non-facing portions 15N are positioned on both sides of the central portion of the width direction W, respectively.

Provided in one end portion (a left end portion in FIGS. 3, 4) in the width direction W of the positive electrode collector is a positive electrode active material layer non-forming part 12n in which the positive electrode active material layer 13 is not formed. The positive electrode sheet 12 is electrically connected with the positive electrode terminal 12A through a positive electrode collector plate 12c provided in the positive electrode active material layer non-forming part 12n. Provided in one end portion (a left end portion in FIGS. 3, 4) in the width direction W of the negative electrode collector is a negative electrode active material layer non-forming part 14n in which the negative electrode active material layer 15 is not formed. The negative electrode sheet 14 is electrically connected with the negative electrode terminal 14A through a negative electrode collector plate 14c provided in the negative electrode active material layer non-forming part 14n.

The separator sheet 16 is disposed between the positive electrode sheet 12 and the negative electrode sheet 14. The separator sheet 16 insulates the positive electrode active material layer 13 from the negative electrode active material layer 15. The separator sheet 16 is configured to be porous so that charge carriers can pass therethrough. Suitable examples of the separator sheet 16 include a resin sheet made of polyethylene (PE) or polypropylene (PP).

For example, the electrolyte is a nonaqueous electrolyte containing a nonaqueous solvent and a supporting electrolyte. Examples of the nonaqueous solvent include carbonates and esters. The supporting electrolyte is dissociated in the nonaqueous solvent, resulting in generation of the charge carriers. Examples of the supporting electrolyte include lithium salt, sodium salt, and magnesium salt. The electrolyte may contain various additives including film-forming agents, such as an oxalato complex compound containing boron atoms and phosphorus atoms or containing boron atoms or phosphorus atoms, and vinylene carbonate (VC). The various additives may also include dispersants and thickeners. The electrolyte may be polymeric (gelatinous). In that case, the electrode body 20 may not have the separator sheet 16.

The temperature sensor 40 is disposed on an external surface of the battery case 30. In the configuration of FIG. 2, the temperature sensor 40 is composed of three sensors disposed along the width direction W. The temperature sensor 40 includes a first temperature sensor 42 positioned at the center of the width direction W, and two second temperature sensors 44 positioned on both the ends of the width direction W. The first temperature sensor 42 detects the temperature of a portion at which the facing portion 15F is positioned, i.e., a portion in which the positive electrode active material layer 13 and the negative electrode active material layer 15 face each other. The two second temperature sensors 44 detect the temperature of portions at which the non-facing portions 15N are positioned.

The sensors constituting the temperature sensor 40 are each a thermocouple sensor in the present embodiment. However, there are no particular restrictions on the sensors constituting the temperature sensor 40 as long as they can detect temperature. For example, the sensors constituting the temperature sensor 40 may be a thermistor. The sensors constituting the temperature sensor 40 may be disposed inside the secondary battery 10. Although one first temperature sensor 42 is provided, two or more first temperature sensors 42 may be disposed at equal intervals along a height direction H (up-down direction of FIG. 2) that is orthogonal to the width direction W, for example. Similarly, one second temperature sensor is disposed in each of the pair of non-facing portions 15N in the present embodiment. However, two or more second temperature sensors may be disposed in each of the non-facing portions 15N.

The temperature sensor 40 is driven with a signal from the controller 60. As a consequence, the first temperature sensor 42 detects the temperature of the facing portion 15F of the secondary battery 10. The second temperature sensors 44 detect the temperature of the non-facing portions 15N of the secondary battery 10. The temperatures detected with the temperature sensor 40 are input into the controller 60.

The heaters 50 are disposed in contact with the external surface of the battery case 30. In the configuration of FIG. 2, the heaters 50 are disposed on both the ends of the width direction W. That is, the heaters 50 are disposed in the non-facing portions 15N of the secondary battery 10, respectively. The heaters 50 raise the temperature of the non-facing portions 15N. For example, the heaters 50 may be configured to raise the temperature of the non-facing portions 15N to a predetermined temperature within the range of 40 to 60° C. and to retain the heated state. The heaters 50 are each an example of the thermoregulator.

The heaters 50 are heating wire heaters in the present embodiment. However, there are no particular restrictions on the heaters 50 as long as they have a function of raising the temperature of the non-facing portions 15N. The heaters 50 may be, for example, heating plates configured to allow a heat medium for heating to pass therethrough. For example, the heating plates may be made of a metal material such as aluminum, or a resin material such as polypropylene (PP) and polyphenylene sulfide (PPS). The heating plates have a plurality of grooves formed thereon. The heat medium for heating passes through the plurality of grooves. Examples of the heat medium for heating include liquids such as silicone oil, and gases such as air. For example, the heat medium for heating may be an exhaust gas discharged from a device incorporating the capacity recovery system 1, such as an engine of a vehicle or the like. The heaters 50 are removable from the battery case 30 in the present embodiment. However, the heaters 50 may be integrated with the battery case 30.

The heaters 50 are disposed in the non-facing portions 15N so as to hold the battery case 30 from both sides in a thickness direction (in the direction from a front side to a rear side of FIG. 2). The heaters 50 have the same length as the non-facing portions 15N in the width direction W. The heaters 50 have the same length as the non-facing portions 15N in the height direction H. Accordingly, the heaters 50 cover lateral surfaces of the non-facing portions 15N in the width direction W and the height direction H. However, the heaters 50 may be shorter than the non-facing portions 15N in the width direction W. The heaters 50 may be longer or shorter than the non-facing portions 15N in the height direction H.

The heaters 50 are driven by a signal from the controller 60 to attain a specified temperature. As a consequence, the non-facing portions 15N are heated from the outside of the secondary battery 10.

The controller 60 controls the secondary battery 10, the temperature sensor 40, and the heaters 50. Although there are no particular restrictions on the configuration of the controller 60, the controller 60 includes, for example, a central processing unit (CPU) that executes commands of a program, a ROM that stores the program executed by the CPU, and a RAM used as a working area for expanding the program.

The controller 60 illustrated in FIG. 1 includes a temperature control unit 61 and a voltage control unit 62. The temperature control unit 61 is configured to regulate the temperature of the non-facing portions 15N to be higher than the temperature of the facing portion 15F. For example, the temperature control unit 61 controls the temperature sensor 40 to detect the temperature of the facing portion 15F and the non-facing portions 15N. When the temperature of the non-facing portions 15N is equal to or below the temperature of the facing portion 15F, the temperature control unit 61 drives the heater 50 to heat the non-facing portions 15N. The temperature control unit 61 is configured to retain the secondary battery 10 in the state where the temperature of the non-facing portions 15N is higher than the temperature of the facing portion 15F for a prescribed time. The voltage control unit 62 includes a current detecting circuit that detects an electric current that flows in and out of the secondary battery 10, and a voltage detecting circuit that detects a voltage across the terminals of the secondary battery 10. The voltage control unit 62 is configured to regulate the state of charge (SOC) of the secondary battery 10. However, the controller 60 may not have the voltage control unit 62.

The capacity recovery system 1 may further include external loads, such as a motor, which is not illustrated. The capacity recovery system 1 may include a charger, which is not illustrated. The secondary battery 10 of the capacity recovery system 1 may electrically be connected with an external load that consumes the electric power stored in the secondary battery 10. The secondary battery 10 of the capacity recovery system 1 may electrically be connected with the charger that can supply electric power to the secondary battery 10.

The capacity recovery system 1 disclosed in the embodiment is applicable to various application. For example, the capacity recovery system 1 may suitably be used to recover the capacity of a high-capacity-type secondary battery mounted, as a driving power source, on a vehicle such as a hybrid vehicle (HV), a plug-in hybrid vehicle (PHV), and an electric vehicle (EV).

<<Capacity Recovery Method>> A description is now given of a capacity recovery method in the capacity recovery system 1. In the electrode body 20 of the secondary battery 10, charge carriers are also diffused in the non-facing portions 15N of the negative electrode active material layer 15 by charging and discharging. However, the charge carriers diffused in the non-facing portions 15N are hard to be released during discharging, and tend to stay in the non-facing portions 15N. Therefore, the charge carriers diffused in the non-facing portions 15N are accumulated little by little in the non-facing portions 15N. As a result, when charging and discharging of the secondary battery 10 is repeatedly performed, the battery capacity gradually declines in proportion to the charge carriers accumulated in the non-facing portions 15N. The capacity recovery method disclosed in the embodiment is effective for such a case. That is, the charge carriers accumulated in the non-facing portions 15N are moved to the facing portion 15F by the capacity recovery method disclosed here. Accordingly, the charge carriers accumulated in the non-facing portions 15N, that is, the amount of the charge carriers which do not contribute to charging and discharging, can be reduced to achieve recovery of the battery capacity.

The capacity recovery method disclosed in the present embodiment is properly executed in such cases where, for example, a specified period elapses after the secondary battery 10 starts to be used and where a specified period elapses after the capacity recovery processing is executed. The capacity recovery method may be executed automatically, when a period of use of the device incorporating the capacity recovery system 1, for example, a travel distance of the vehicle, reaches a specified value. The capacity recovery method is typically executed on a periodic basis in every specified period.

Figure 5:
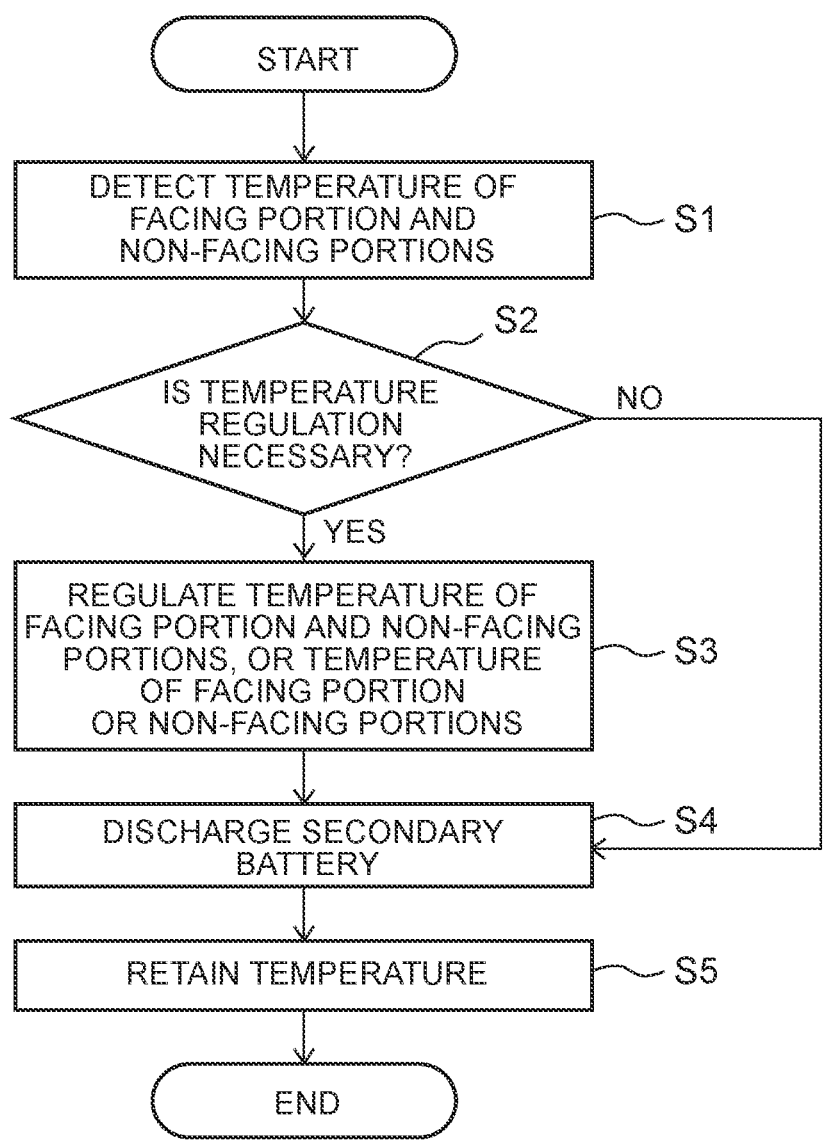
FIG. 5 is a flowchart of a capacity recovery method according to one embodiment.

FIG. 5 is a flowchart of the capacity recovery method according to one embodiment. The capacity recovery method of the present embodiment includes (step S1) temperature detection process, (step S2) temperature determination process, (step S3) temperature regulation process, (step S4) discharge process, and (step S5) temperature retaining process. Each of the processes will be described below in order.

First, in step S1, the temperature of the facing portion 15F and the non-facing portions 15N of the secondary battery 10 is detected. Specifically, the temperature control unit 61 of the controller 60 controls the first temperature sensor 42 and the second temperature sensor 44 to detect the temperature of the facing portion 15F and the temperature of the non-facing portions 15N. The temperatures detected by the first temperature sensor 42 and the second temperature sensor 44 are input into the temperature control unit 61 of the controller 60.

When the temperature control unit 61 of the controller 60 constantly monitors the temperature of the facing portion 15F and the temperature of the non-facing portions 15N for such a purpose as enhancing overcharge resistance, or when the temperature control unit 61 is configured to detect the temperature of the facing portion 15F and the temperature of the non-facing portions 15N at prescribed periods, the results of temperature detection may be used to skip step S1.

Next, in step S2, the necessity of temperature regulation is determined based on the detection result of step S1. Specifically, a relation between the temperature of the facing portion 15F and the temperature of the non-facing portions 15N is evaluated. That is, it is determined whether or not the temperature of the non-facing portions 15N is higher than the temperature of the facing portion 15F. Furthermore, it may be determined in step S2 whether or not the temperature of the non-facing portions 15N is generally 5° C. or more, and typically 10° C. or more, for example, 15° C. or more, higher than the temperature of the facing portion 15F. When a temperature difference between the facing portion 15F and the non-facing portions 15N is a specified value or more, the technique disclosed in the present embodiment can demonstrate higher effects.

In one suitable aspect, not only the relation between the temperature of the facing portion 15F and the temperature of the non-facing portions 15N, but also an absolute temperature of the portions where the heaters 50 are disposed, which are the non-facing portions 15N in the present embodiment, are evaluated. For example, it is determined whether or not the temperature of the non-facing portions 15N is generally 30° C. or more, and typically 40° C. or more, for example, 45° C. or more.

When it is determined that temperature regulation is necessary (step S2: YES), the processing proceeds to step S3. When it is determined that temperature regulation is not necessary (step S2: NO), the processing proceeds to step S4.

Next, in step S3, the temperature of the portions in which the heaters 50 are disposed is regulated. Here, the non-facing portions 15N are heated. Specifically, the temperature control unit 61 of the controller 60 controls the heaters 50 to set the heaters 50 at a specified temperature. The temperature of the non-facing portions 15N is regulated to be higher than the temperature of the facing portion 15F. In step S3, the temperature of the non-facing portions 15N may further be regulated to be generally 5° C. or more, and typically 10° C. or more, for example, 15° C. or more, higher than the temperature of the facing portion 15F, for example. The temperature of the non-facing portions 15N may be regulated such that the temperature difference between the non-facing portions 15N and the facing portion 15F becomes generally 50° C. or less, and typically 30° C. or less, for example, 20° C. or less.

In one suitable aspect, not only the temperature of the non-facing portions 15N may be regulated based on the relation between the temperature of the facing portion 15F and the temperature of the non-facing portions 15N, but also the temperature of the non-facing portions 15N may be regulated, for example, to be generally 30° C. or more, and typically 40° C. or more, for example, 45° C. or more. When the temperature of the non-facing portions 15N is set at a specified value or more, the moving velocity of the charge carriers can further be enhanced.

Next, in step S4, the secondary battery 10 is discharged to a specified charging state (SOC). For example, when the capacity recovery system 1 includes a charger, the voltage control unit 62 of the controller 60 causes the secondary battery 10 to discharge electric power. The voltage control unit 62 uses the discharged electric power to charge the charger. Or when the capacity recovery system 1 includes an external load, the voltage control unit 62 of the controller 60 may cause the secondary battery 10 to discharge electric power, and cause the electric power corresponding to the discharged electric power to be used for the external load.

In one suitable aspect, the secondary battery 10 is discharged until the SOC becomes 0% or less. For example, the secondary battery, which stores a voltage of about 3.8 to 4.2 V when the SOC is 100%, may be discharged until the voltage across the terminals becomes 1.5 V or less. As a consequence, the amount of the charge carriers contained in the facing portion 15F significantly decreases, which causes a large difference in density of the charge carriers between the facing portion 15F and the non-facing portions 15N. As a result, the moving velocity of the charge carriers can further be enhanced.

When the capacity recovery system 1 includes neither the charger nor the external load, step S4 may be skipped. In that case, the processing may proceed to step S5 after step S2. In the present embodiment, temperature regulation is performed in step S3, and then discharge processing is performed in step S4. However, the secondary battery 10 may be discharged before step S5, such as before or after step S1.

Next, in step S5, the state where the temperature of the non-facing portions 15N is higher than the temperature of the facing portion 15F is retained for a prescribed time. The moving velocity of the charge carriers may vary depending on processing such as regulating the temperature of the non-facing portions 15N in step S3, and regulating the SOC in step S4. Therefore, the retention time of step S5 is not particularly limited. In one suitable aspect, the retention time may generally be 10 minutes or more, for example, 30 minutes or more, from a viewpoint of demonstrating more satisfactory effects of the technique disclosed herein. In another suitable aspect, from a viewpoint of enhancing working efficiency or a viewpoint of reducing the load applied to the negative electrode collector, the retention time may generally be 24 hours or less, typically be 12 hours or less, and preferably be 6 hours or less, for example, 1 hour or less.

In one suitable aspect, the voltage control unit 62 of the controller 60 maintains the SOC of the secondary battery 10 at a value equal to the value regulated in step S4, for example, at 0% or less. As a consequence, the technique disclosed in the present embodiment may demonstrate higher effects.

Thus, the capacity recovery processing is terminated. In the capacity recovery method disclosed herein, the temperature of the non-facing portions 15N is set higher than the temperature of the facing portion 15F, and is maintained for a prescribed time. Accordingly, the moving velocity of the charge carriers accumulated in the non-facing portions 15N can be enhanced, so that the charge carriers can effectively be moved to the facing portion. In the portion where the positive electrode active material layer 13 and the negative electrode active material layer 15 face each other, the side reaction can be suppressed. Therefore, the battery capacity can be recovered, while deterioration of the battery can be kept low.

Hereinafter, examples relating to the present disclosure will be described. However, the examples are not intended to limit the present disclosure thereto.

First, a secondary battery including an electrode body and a nonaqueous electrolyte was prepared. The electrode body had a positive electrode having a positive electrode active material layer on a positive electrode collector, a negative electrode having a negative electrode active material layer on a negative electrode collector, and a separator. The positive electrode and the negative electrode faced each other with the separator interposed therebetween. The negative electrode active material layer was larger in area than the positive electrode active material layer. Accordingly, the negative electrode active material layer had a facing portion that faced the positive electrode active material layer, and non-facing portions that did not face the positive electrode active material layer. Such a secondary battery was charged and discharged a plurality of times in an SOC range of zero to 100% under the environment of 60° C., so that the battery capacity of the secondary battery was lowered. Thus, a total of 10 secondary batteries with a lowered battery capacity was prepared.

Next, temperature sensors were attached to the external surface of each of the secondary batteries. The temperature sensors were attached to the facing portion of the secondary battery where the facing portion of the negative electrode active material layer was disposed and to the non-facing portions of the secondary battery where the non-facing portions of the negative electrode active material layer were disposed, respectively. The secondary batteries were each equipped with a heating wire heater for heating the non-facing portions.

<Measurement of Capacity Recovery Rate> First, each of the secondary batteries was charged and discharged with a constant current of ⅓ C under a temperature environment of 25° C. A discharge capacity of each of the secondary batteries at that time was defined as a battery capacity before recovery processing. Then, the facing portion and the non-facing portions in each of the secondary batteries were regulated to temperatures illustrated in Table 1. Specifically, each of the secondary batteries was installed in a thermostatic oven set at temperatures illustrated in a column of the facing portion in Table 1. In first and second examples, the non-facing portions were heated with the heating wire heaters so that the temperature of the non-facing portions became set temperatures illustrated in Table 1. As a consequence, in the first and second examples, the temperature of the non-facing portions was regulated to be higher than the temperature of the facing portion. Meanwhile, in first to third comparative examples, the non-facing portions were not heated, and the temperature of the facing portion was regulated to be the same as the temperature of the non-facing portions.

Next, each of the secondary batteries was discharged with a constant current until the voltage across the terminals became 1.5 V so as to regulate the SOC of each of the secondary batteries to 0%. Each of the secondary batteries was then discharged with a constant voltage of 1.5 V for 30 minutes at the temperature being maintained to execute capacity recovery processing. Then, under a temperature environment of 25° C., the discharge capacity of each of the secondary batteries was measured again, and the measured capacity was defined as a battery capacity after recovery processing. A capacity recovery rate (%) was calculated by subtracting the battery capacity before recovery processing from the battery capacity after recovery processing, and dividing a resultant value by the battery capacity before recovery processing. The calculated result is illustrated in Table 1.

<Measurement of Resistance Increase Rate> First, under the temperature environment of 25° C., each of the secondary batteries was discharged with a constant current to regulate the SOC of each of the secondary batteries to 20%. Each of the secondary batteries having the SOC of 20% was discharged with a current rate of 5 C for 10 seconds. In that state, a battery resistance of each of the secondary batteries before recovery processing was measured. Then, the facing portion and the non-facing portions in each of the secondary batteries were regulated to set temperature illustrated in the Table 1. The regulation processing is similar to the processing performed in measurement of the capacity recovery rate.

Next, each of the secondary batteries was discharged with a constant current until the voltage across the terminals became 1.5 V so as to regulate the SOC of each of the secondary batteries to 0%. Each of the secondary batteries was then discharged with a constant voltage of 1.5 V for seven days at the temperature being maintained to execute capacity recovery processing. Under the temperature environment of 25° C., each of the secondary batteries was again regulated to have a SOC of 20%. A battery resistance after recovery processing was measured in that state. A resistance increase rate (%) was calculated by subtracting the battery resistance before recovery processing from the battery resistance after recovery processing, and dividing a resultant value by the battery resistance before recovery processing. The calculated result is illustrated in Table 1.

TABLE 1

| | Temperature (° C.) | | Capacity recovery rate (%) | Resistance increase rate (%) |
|---|---|---|---|---|
| | Facing portion | Non-facing portion | | |
| First comparative example | 25 | 25 | 2.1 | 0.8 |
| First example | 25 | 40 | 3.2 | 1.2 |
| Second comparative example | 45 | 45 | 3.4 | 15.1 |
| Second example | 45 | 60 | 4.1 | 15.9 |
| Third comparative example | 60 | 60 | 4.2 | 261 |

As illustrated in Table 1, according to the comparison among the first comparative example to the third comparative example, the capacity recovery rate becomes higher as the retained temperature of the secondary batteries is higher. However, it is also indicated that the resistance increase rate increases concurrently with the capacity recovery rate, when the temperature of the non-facing portions is identical to the temperature of the facing portion. This may be because while the secondary batteries were retained at high temperature, not only the charge carriers moved from the non-facing portions to the facing portion but also the batteries were deteriorated due to a side reaction. According to the comparison between the first comparative example and the first example, and between the second comparative example and the second example, the capacity recovery rate increased in the first and second examples where the temperature of the non-facing portions was regulated to be higher than the temperature of the facing portion, though increase in the resistance increase rate was suppressed as compared with the first comparative example and the second comparative example.

The above-stated results indicate that regulating the temperature of the non-facing portions to be higher than the temperature of the facing portion allows adequate recover of the capacity of the secondary battery. That is, the velocity at which the charge carriers move from the non-facing portions to the facing portion can be increased by relatively raising the temperature of the non-facing portions. As a consequence, the capacity of the secondary battery can efficiently be recovered in a short time. Moreover, when the temperature of the facing portion is relatively decreased, side reactions such as decomposition of a coating film formed on the surface of the negative electrode active material in the facing portion can be suppressed, for example. Hence, the capacity recovery rate can be enhanced, while deterioration in battery characteristics can be avoided.

Although specific examples of the present disclosure have been described in detail in the foregoing, they are merely illustrative and are not intended to limit the claims of the disclosure. The technique described in the claims includes various modifications and variations of the specific examples illustrated in the foregoing.

Figure 6:
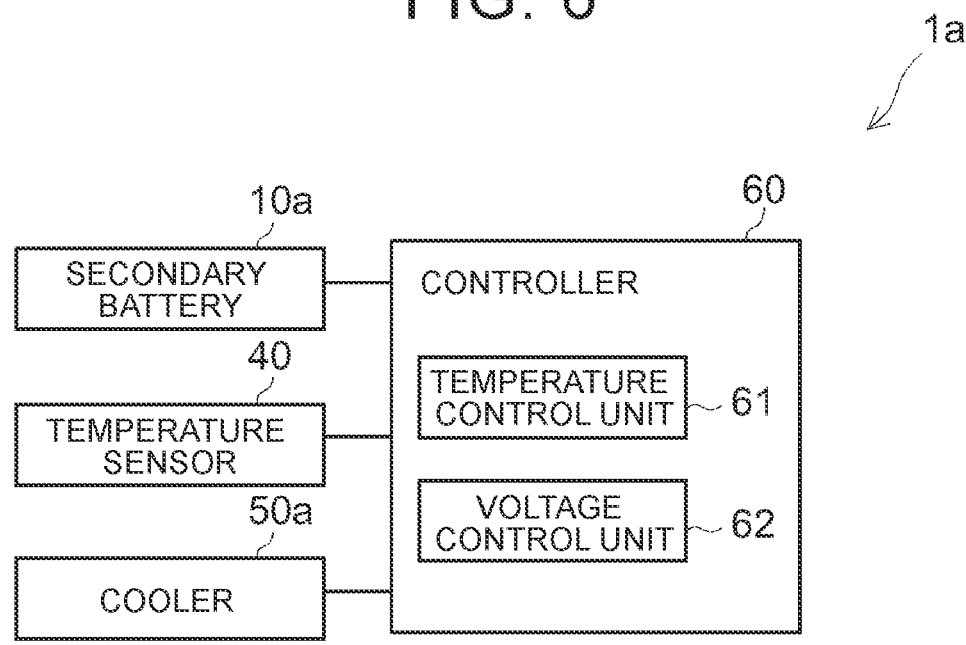
FIG. 6 is a block diagram of a capacity recovery system according to another embodiment.
Figure 7:
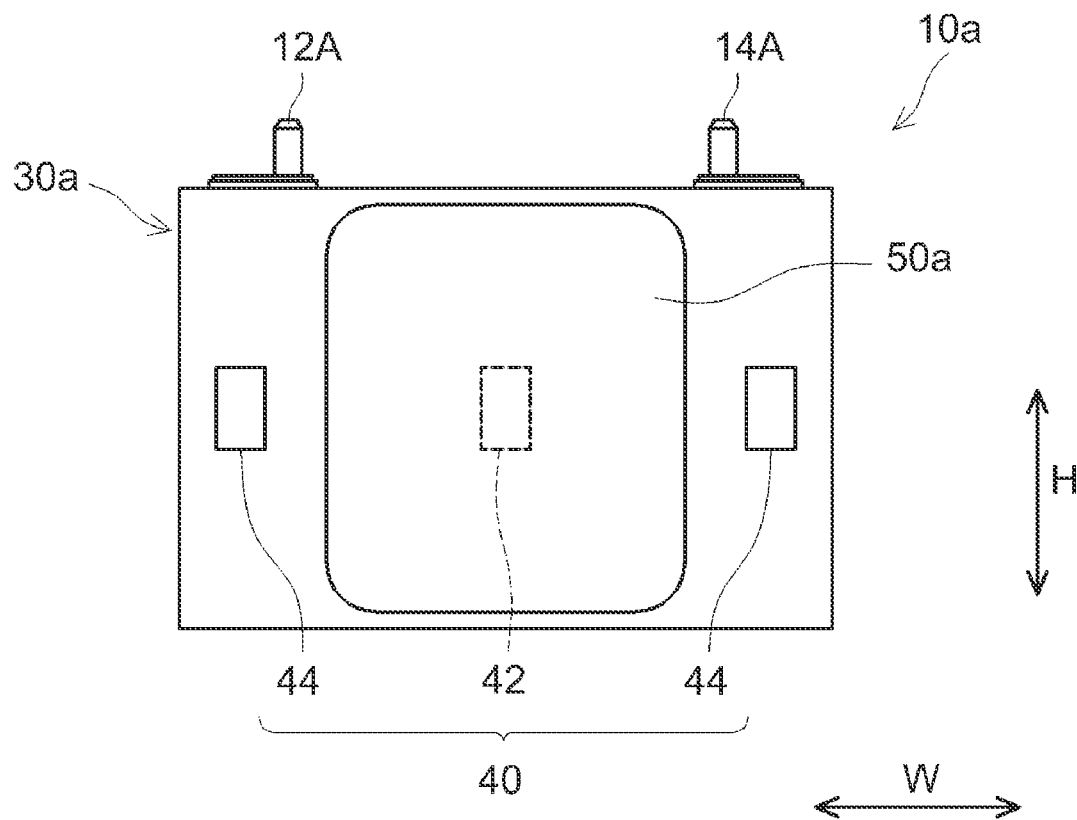
FIG. 7 is a plan view schematically illustrating an external appearance of a secondary battery according to another embodiment.

For example, in the above-stated embodiment, the heaters 50, which are used as a thermoregulator, are disposed in the non-facing portions 15N of the secondary battery 10. However, the present disclosure is not limited thereto. FIG. 6 is a block diagram of a capacity recovery system 1a according to another embodiment. FIG. 7 is a plan view schematically illustrating an external appearance of a secondary battery 10a according to another embodiment. The capacity recovery system 1a of the present embodiment includes coolers 50a in place of the heaters 50 as a thermoregulator. Other configurational aspects are similar to those of the above-stated capacity recovery system 1.

As illustrated in FIG. 7, the coolers 50a are disposed on an external surface of a battery case 30a. The coolers 50a are disposed in a facing portion of the secondary battery 10a, i.e., at the center in the width direction W. The coolers 50a are configured to lower the temperature of the facing portion. The coolers 50a may be configured to cool the temperature of the facing portion to a predetermined temperature generally in the range of zero to 30° C., for example, in the range of 5 to 25° C. for example, and to retain the cooled state.

The coolers 50a are heat sinks in the present embodiment. However, there are no particular restrictions on the coolers 50a as long as they have a function of lowering the temperature of the facing portion. For example, the coolers 50a may be electric fans using a radiator and the like. For example, the heat sinks are made of a material same as the material of the heating plates. The heat sinks have a plurality of grooves formed thereon. The plurality of grooves each have a heat medium for cooling (so-called coolant) passing therethrough. Examples of the coolant include liquids such as an antifreeze, and gases such as air and carbon dioxide. The coolers 50a may be removable from the battery case 30a, or may be integrated with the battery case 30a.

The coolers 50a are disposed in the facing portion so as to hold the battery case 30 from both sides in a thickness direction (in the direction from a front side to a rear side of FIG. 7). The coolers 50a have the same length as the facing portion in the width direction W. The coolers 50a have the same length as the facing portion in the height direction H. Accordingly, the coolers 50a cover lateral surfaces of the facing portion in the width direction W and the height direction H. However, the coolers 50a may be shorter than the facing portion in the width direction W. The coolers 50a may be longer or shorter than the facing portions in the height direction H.

The coolers 50a are driven by a signal from the controller 60 to attain a specified temperature. As a consequence, the facing portion is cooled from the outside of the secondary battery 10a.

In the capacity recovery system 1a in the aspect that the coolers 50a are disposed in the facing portion, not only the relation between the temperature of the facing portion and the temperature of the non-facing portions, but also an absolute temperature of the facing portion may be evaluated in step S2 of the capacity recovery method. For example, it may be determined whether or not the temperature of the facing portion is generally 60° C. or less, and typically 50° C. or less, for example, 45° C. or less.

In the capacity recovery system 1a, the portion where the coolers 50a are disposed, i.e., the facing portion, is cooled in step S3 of the capacity recovery method. Specifically, the temperature control unit 61 of the controller 60 controls the coolers 50a to set the coolers 50a at a specified temperature. Accordingly, the temperature of the non-facing portions is regulated to be higher than the temperature of the facing portion. In other words, the temperature of the facing portion is regulated to be lower than the temperature of the non-facing portions. Furthermore, it may be regulated in step S3 whether or not the temperature of the facing portion is generally 5° C. or more, and typically 10° C. or more, for example, 15° C. or more, lower than the temperature of the non-facing portions. In one suitable aspect, not only the temperature of the facing portion may be regulated based on the relation between the temperature of the facing portion and the temperature of the non-facing portions, but also the temperature of the facing portion may be regulated, for example, to be generally 30° C. or less, for example, 25° C. or less. When the temperature of the facing portion is regulated to be a specified value or less, side reactions in the facing portion may be suppressed further.

In the capacity recovery method in the above-stated embodiments, the capacity recovery processing is executed in every specified period. However, the present disclosure is not limited thereto. For example, before the capacity recovery method is executed, the battery capacity of the secondary battery 10 may be measured, and based on the degree of deterioration in the battery capacity, the necessity of the capacity recovery processing may be determined. Specifically, the secondary battery 10 is first charged and discharged with a constant current of about ⅕ to 2 C in the SOC range of zero to 100%. At the state, the battery capacity of the secondary battery 10 is measured. Next, the measured battery capacity is compared with an initial battery capacity stored in the controller 60 or the battery capacity after previous capacity recovery processing. When the battery capacity of the secondary battery 10 is lower than a specified threshold, it may be determined that the capacity recovery processing is necessary. As a result, the capacity recovery processing may be executed. The threshold value may be a capacity reduction ratio of 5%, for example.

In the capacity recovery method of the above-stated embodiments, the capacity recovery processing is terminated after the temperature of the non-facing portions are retained at a temperature higher than the temperature of the facing portion for a prescribed time in step S5. However, the present disclosure is not limited thereto. For example, after step S5, the battery capacity of the secondary battery 10 may be measured, and it may be determined whether or not the battery capacity has been recovered at a prescribed ratio or more. When battery capacity is not recovered at the prescribed ratio or more, the processing may return again to step S4 or step S5 to repeat the process a plurality of times.

What is claimed is:

1. A capacity recovery method for a secondary battery, the secondary battery including a positive electrode having a positive electrode active material layer, a negative electrode having a negative electrode active material layer, and an electrolyte, the negative electrode active material layer having a facing portion that faces the positive electrode active material layer and a non-facing portion that does not face the positive electrode active material layer, the capacity recovery method comprising:
retaining the secondary battery at a constant voltage in a state where a temperature of the non-facing portion is higher than a temperature of the facing portion for a prescribed time.

2. The capacity recovery method according to claim 1, wherein when the temperature of the non-facing portion is equal to or below the temperature of the facing portion, the non-facing portion is heated.

3. The capacity recovery method according to claim 1, wherein when the temperature of the non-facing portion is equal to or below the temperature of the facing portion, the facing portion is cooled.

4. The capacity recovery method according to claim 1, wherein before the secondary battery is retained for the prescribed time, the secondary battery is discharged to reduce a state of charge of the secondary battery to 0% or below.

5. A capacity recovery system for a secondary battery, comprising:
a secondary battery including a positive electrode having a positive electrode active material layer, a negative electrode having a negative electrode active material layer, and an electrolyte, the negative electrode active material layer having a facing portion that faces the positive electrode active material layer and a non-facing portion that does not face the positive electrode active material layer;
a first temperature sensor that detects a temperature of the facing portion;
a second temperature sensor that detects a temperature of the non-facing portion;
a thermoregulator that regulates the temperature of at least one of the facing portion and the non-facing portion, when the temperature of the non-facing portion is equal to or below the temperature of the facing portion; and
a controller that controls the secondary battery, the first temperature sensor, the second temperature sensor, and the thermoregulator, wherein the controller is configured to retain the secondary battery at a constant voltage in a state where the temperature of the non-facing portion is higher than the temperature of the facing portion for a prescribed time.

6. The capacity recovery method according to claim 2, wherein the entire non-facing portion is heated from both sides in a thickness direction.

7. The capacity recovery method according to claim 3, wherein the entire facing portion is cooled from both sides in a thickness direction.

* * * * *